United States Patent
Bedford et al.

(10) Patent No.: US 11,629,059 B2
(45) Date of Patent: Apr. 18, 2023

(54) ULTRA-WHITE SILICA-BASED FILLER

(71) Applicant: Covia Holdings LLC, Independence, OH (US)

(72) Inventors: Gregory Kenneth Bedford, Spring, TX (US); Claud Eric Westbrook, III, Conroe, TX (US)

(73) Assignee: Covia Holdings LLC, Independence, OH (US)

( * ) Notice: Subject to any disclaimer, the term of this patent is extended or adjusted under 35 U.S.C. 154(b) by 54 days.

(21) Appl. No.: 17/005,751

(22) Filed: Aug. 28, 2020

(65) Prior Publication Data
US 2021/0061666 A1    Mar. 4, 2021

Related U.S. Application Data

(60) Provisional application No. 62/893,560, filed on Aug. 29, 2019.

(51) Int. Cl.
| | |
|---|---|
| *C01B 33/12* | (2006.01) |
| *C04B 14/06* | (2006.01) |
| *C09J 11/04* | (2006.01) |
| *C09K 3/10* | (2006.01) |

(52) U.S. Cl.
CPC ............. *C01B 33/12* (2013.01); *C04B 14/06* (2013.01); *C09J 11/04* (2013.01); *C09K 3/10* (2013.01); *C01P 2006/62* (2013.01); *C01P 2006/80* (2013.01); *C09K 2200/0247* (2013.01)

(58) Field of Classification Search
CPC ....... C04B 14/06; C04B 20/04; C04B 20/023; C04B 2111/80; C04B 2111/82; C04B 28/02; C01B 33/12; C01P 2006/62; C01P 2006/80; C09J 11/04; C09K 2200/0247; C09K 3/10
See application file for complete search history.

(56) References Cited

U.S. PATENT DOCUMENTS

| | | |
|---|---|---|
| 1,544,433 A | 6/1925 | Coss et al. |
| 1,669,363 A | 5/1928 | Watson et al. |
| 2,023,278 A | 12/1935 | McGregor et al. |
| 2,066,366 A | 1/1937 | Salmang et al. |
| 2,446,975 A | 8/1948 | Brick et al. |
| 3,314,758 A | 4/1967 | Scott et al. |
| 4,036,798 A | 7/1977 | Hoppe et al. |
| 4,073,729 A | 2/1978 | Kraemer et al. |
| 4,143,867 A | 3/1979 | Hoppe et al. |
| 4,195,458 A | 4/1980 | Hoppe et al. |
| 4,234,347 A | 11/1980 | Kirilishin |
| 4,336,235 A | 6/1982 | Deabriges |
| 4,683,128 A | 7/1987 | Orii et al. |
| 4,853,198 A | 8/1989 | Orii et al. |
| 4,956,059 A | 9/1990 | Englisch et al. |
| 4,983,370 A | 1/1991 | Loritsch et al. |
| 5,096,857 A | 3/1992 | Hu et al. |
| 5,154,905 A | 10/1992 | Oshima et al. |
| 5,215,732 A | 6/1993 | Hachgenei et al. |
| 5,240,760 A | 8/1993 | George et al. |
| 5,264,168 A | 11/1993 | Toncelli |
| 5,310,708 A | 5/1994 | Harako et al. |
| 5,643,347 A | 7/1997 | Werdecker et al. |
| 5,876,473 A | 3/1999 | Inaki et al. |
| 5,976,478 A | 11/1999 | Swanson et al. |
| 6,225,245 B1 | 5/2001 | Utsunomiya et al. |
| 6,277,349 B1 | 8/2001 | Westbrook et al. |
| 6,291,378 B1 | 9/2001 | Evans et al. |
| 6,406,552 B1 | 6/2002 | Schultheis |
| 6,517,915 B1 | 2/2003 | Banus |
| 6,818,055 B2 | 11/2004 | Schelinski |
| 7,452,518 B2 | 11/2008 | Hansen et al. |
| 10,253,219 B2 | 4/2019 | Sato et al. |
| 2004/0089024 A1 | 5/2004 | Tomozawa et al. |
| 2015/0192698 A1 | 7/2015 | Joedicke et al. |
| 2016/0318805 A1* | 11/2016 | Di Loreto ............... C04B 35/66 |
| 2020/0064517 A1 | 2/2020 | Joedicke et al. |
| 2020/0346979 A1 | 11/2020 | Margalit et al. |

(Continued)

FOREIGN PATENT DOCUMENTS

| | | |
|---|---|---|
| CH | 283045 A | 5/1952 |
| CN | 1522957 A | 8/2004 |

(Continued)

OTHER PUBLICATIONS

International Search Report and Written Opinion from PCT/US2020/048376 dated Dec. 4, 2020.
Munasir et al., Phase Transition of SiO2 Nanoparticles Prepared from Natural Sand: The Calcination Temperature Effect, Journal of Physis : Conf. Series 1093; 2018 pp. 1-9.
Nurbaiti, Synthesis of cristobalite from silica sands of Tuban and Tanah Laut, Journal of Phusics: Conf. Series 982; 2018, pp. 1-4.
Lind, Growing Quartz, Hydrothermal Growth, http://www.tedlind.net/hydrothermal_growth.htm, 2010.
Li, (China Triumph International Engineering Group Co,Ltd), Study on Sand for Solar Ultra-white Glass by Mineral Processing, https://en.cnki.com.cn/Article_en/CJFDTotal-GWJK201205015.htm, 2012, China.

(Continued)

*Primary Examiner* — Shuangyi Abu Ali
(74) *Attorney, Agent, or Firm* — Calfee, Halter & Griswold LLP

(57) ABSTRACT

An ultra-white granular silica-based filler comprises at least 99.5 wt. % silica, wherein the crystal structure of the silica is such that the silica-based filler comprises 40 to 80 wt. % cristobalite, 1 to 25 wt. % tridymite, 2-60 wt. % quartz and <5 wt. % amorphous silica, wherein the temperature of the ultra-white granular silica-based filler is no higher than 50° C. and further wherein the ultra-white granular silica-based filler exhibits an L* value in the CIELAB color space of 95-98. In addition, an ultra-white powder filler is obtained by milling, grinding or comminuting the ultra-white granular silica-based filler. The ultra-white powder filler exhibits an L* value in the CIELAB color space of 95-98.5.

19 Claims, No Drawings

(56) References Cited

U.S. PATENT DOCUMENTS

| | | |
|---|---|---|
| 2021/0017079 A1 | 1/2021 | Liu et al. |
| 2021/0017080 A1 | 1/2021 | Liu et al. |
| 2021/0039995 A1 | 2/2021 | Dunlap et al. |
| 2021/0061666 A1 | 3/2021 | Bedford et al. |
| 2021/0323869 A1 | 10/2021 | Bawri et al. |

FOREIGN PATENT DOCUMENTS

| | | | |
|---|---|---|---|
| CN | 102092722 A | 6/2011 | |
| CN | 103979546 A | 8/2014 | |
| CN | 105036546 A | 11/2015 | |
| CN | 106495564 A | 3/2017 | |
| CN | 107033633 A | 8/2017 | |
| FR | 1311529 A | 10/1962 | |
| FR | 1471660 A | 1/1967 | |
| JP | 3115162 B2 | 12/2000 | |
| WO | 9638396 A1 | 12/1996 | |
| WO | 2008098470 A1 | 8/2008 | |
| WO | 2015091126 A1 | 6/2015 | |
| WO | 2016031823 A1 | 3/2016 | |
| WO | WO-2018155367 A1 * | 8/2018 | ............ B22D 11/10 |
| WO | 2018186308 A1 | 10/2018 | |

OTHER PUBLICATIONS

Arunmetha et al., Size-dependent physicochemical properties of mesoporous nanosilica produced from natural quartz sand using three different methods, RSC Advances, Issue 59, 2015.

* cited by examiner

ULTRA-WHITE SILICA-BASED FILLER

CROSS-REFERENCE TO RELATED APPLICATIONS

This application claims priority to and the benefit of U.S. Provisional Patent Application No. 62/893,560, filed Aug. 29, 2019, the entire content of which is incorporated by reference herein.

BACKGROUND

Man-made products such as engineered stone, sealants, adhesives and concrete are often made with ultra-white fillers for enhancing color and brightness. Binders such as Portland cement, as well as various mortars and grouts can also made with such ultra-white fillers.

The ultra-white filler of choice for many of these products is cristobalite, because of its high degree of whiteness and relatively low cost. Although naturally occurring, cristobalite used for making man-made products is usually produced industrially by heating 99.5 wt. % pure quartz sand—i.e., sand which is 99.5% pure in silica substantially all of which has a quartz crystal structure—until essentially all of its quartz content has been transformed into other forms of silica. Normally, this is done by heating the quartz sand to ≥1550° C. for ≥1 hour in a rotary kiln adapted to cause the sand to tumble over itself as it travels from the kiln's inlet to its outlet. This produces an ultra-white cristobalite product which exhibits an L* value in the CIELAB color space of 98 or more and which contains at least about 85 wt. % cristobalite, less than 1 wt. % quartz and some amount of amorphous silica, typically about 5 wt. % or more.

SUMMARY

In accordance with this invention, it has been found that an ultra-white filler having a whiteness level approaching that of industrially-produced cristobalite can be produced at significantly lower cost by thermally processing the pure quartz sand starting material under conditions much less severe than used to make industrially-produced cristobalite, terminating thermal processing while the quartz content of the product is still 2 wt. % or more, and then cooling the thermally-processed product so made to 50° C. or less. In accordance with this invention, it has been found that this approach produces an ultra-while silica-based filler which exhibits an L* value almost as high as, and in some instances as high as, that of industrial cristobalite, i.e. 95-98.5 vs. ≥97, even though the thermal processing conditions used are much less severe in terms of time and temperature than those used to produce industrial cristobalite and even though the product obtained contains significantly more quartz and significantly less cristobalite than industrial cristobalite.

Accordingly, this invention provides an ultra-white granular silica-based filler comprising at least 99.5 wt. % silica, wherein the crystal structure of the silica is such that the ultra-white granular silica-based filler comprises 40 to 80 wt. % cristobalite, 1 to 25 wt. % tridymite, 2-60 wt. % quartz and ≤2 wt. % amorphous silica, wherein the temperature of the ultra-white granular silica-based filler is 50° C. or less and further wherein the ultra-white granular silica-based filler exhibits an L* value in the CIELAB color space of 95-98.

In addition, this invention also provides an ultra-white powder filler obtained by milling, grinding or comminuting the ultra-white granular silica-based filler to a particle size of 325 mesh or finer, including 400 mesh or finer. This powder product exhibits an L* value in the CIELAB color space of 95-98.5.

In addition, this invention provides an ultra-white silica-based filler exhibiting an L* value in the CIELAB color space of 95-98.5 and comprising one or more of an ultra-white granular silica-based filler, an ultra-white powder silica-based filler or combinations thereof.

In addition, this invention also provides a man-made product comprising a filler and a binder, wherein the filler comprises the above ultra-white granular silica-based filler and/or ultra-white powder filler.

In addition, this invention also provides a process for producing an ultra-white granular silica-based filler comprising heating a silica starting material comprising at least 95% quartz silica for a time and at a temperature sufficient so that at least some of the silica in the silica starting material is converted from a quartz crystal structure to a cristobalite crystal structure and thereafter cooling the heated product so made to 50° C. or less, wherein the silica starting material is heated sufficiently so that ≥2 to 60 wt. % of the silica in the ultra-white granular silica-based filler ultimately obtained has a quartz crystal structure and further so that the ultra-white granular silica-based filler contains ≤2 wt. % amorphous silica and exhibits an L* value in the CIELAB color space of 95-98. The process further comprises milling, grinding or comminuting the resulting ultra-white granular silica-based filler to obtain an ultra-white powder filler having particle size of 325 mesh or finer and exhibiting an L* value in the CIELAB color space of 95-98.5.

DETAILED DESCRIPTION

Silica Starting Material

The silica starting material which is subjected to the thermal treatment process of this invention will normally contain >99 wt. % silica, more typically ≥99.3 wt. % or even ≥99.5 wt. % silica, 95% or more of which will be quartz silica. In this context, "quartz silica" means silica having a quartz crystal structure. Thus, this starting material will normally contain about 95 wt. % (~99.5 wt. %×95%=~95 wt. %) or more of quartz silica. Preferred starting materials can contain as much as 99 wt. % or more of quartz silica.

Quartz sand ore processing normally begins with a series of steps carried out to liberate the desired quartz ore from gross impurities. These steps typically include crushing (if hard rock or sandstone), scrubbing, washing, hydro-sizing and desliming. If the ore contains dissimilar materials such as feldspar, garnets and mica, flotation may also be needed. Magnetic separation can also be used for removing magnetic or para-magnetic particles. Thereafter, the cleaned ore is normally dried and classified by size, which is typically done by bulk dewatered using cyclones and/or pile draining, heating to dryness (<1 wt. % water) and sizing via screens or sifters.

In addition to these typical cleaning steps, additional more exotic and expensive purification steps can be carried out to produce silica materials having extremely high silica purities (i.e., 99.9%+) and even ultra-high silica purities (i.e., 99.99%+). For example, as shown in U.S. Pat. No. 4,983,370, an HF aqueous leach can be used to provide a strong chemical cleaning of the quartz grain surfaces followed by a gaseous HCl treatment for removing internal contaminants found inside the individual sand grains. Or, as shown in U.S. Pat. No. 7,452,518, the cleaned quartz grains can be heated in an ozone-containing atmosphere. Or, as shown in a variety of references including U.S. Pat. Nos. 4,683,128, 4,853,198, 5,154,905 and WO 2008/098470, a high purity silica material can be made by using an aqueous solution of a strong acid or base to extract silica from the raw sand grains in the form of a water-soluble compound such as an alkali metal silicate or an alkoxy silane, followed by treating the water soluble compound by a variety of different cleaning steps.

Although some or all of these more exotic and expensive purification techniques can be used to provide the silica starting material of the inventive process, it is desirable that they be avoided in order to minimize costs. Thus, the starting material of choice for use in this invention is preferably raw quartz sand which already has the desired relatively high level of silica purity or which can be easily and inexpensively cleaned such as by scrubbing, washing, hydro-sizing, desliming and the like to achieve this relatively high level of silica purity.

In this context, "raw quartz sand" will be understood to mean a naturally-occurring free-flowing, sand in which at least 95 wt. % of the silica present has a quartz crystal structure.

In addition, "naturally-occurring" will be understood to mean that, prior to when the thermal treatment process of this invention begins, the silica starting material has not been treated so as to convert it chemically to another material such as occurs, for example, when quartz silica is converted into an alkali metal silicate, an alkoxy silane or a hydrolyzed silica or to convert it physically to another material such as occurs, for example, when particulate silica is transformed into a silica sol or water-glass or when particulate silica is fired/sintered at temperatures high enough to change the phase structure of the silica from crystalline to amorphous and/or to change the shape of the silica particle to more-nearly spherical. Thus, "naturally-occurring" means that the particulate product is found essentially as is in nature such as occurs, for example, in the case of beach sand, quarry sand, and sand obtained by crushing sandstone and the like.

Unless otherwise indicated, all mesh sizes disclosed herein refer to mesh (U.S.).

Unless otherwise indicated, "an ultra-white silica-based filler" includes an ultra-white granular silica-based filler in accordance with the present disclosure, an ultra-white powder filler in accordance with the present disclosure or combinations thereof.

Finally, "cleaned" and "cleaning" as it relates to raw quartz sand will be understood to mean removing non-siliceous ingredients from the surfaces of the raw quartz sand grains. It does not mean and excludes processes in which silica in the form of a water soluble compound is extracted from the raw quartz sand grains following which silica is recovered from the extracted water soluble compound.

In any event, it should be understood that the starting material of the inventive process will normally contain some small amount of impurities, typically ≥0.05 wt. %, more typically ≥0.1 wt. %, ≥0.15 wt. %, ≥0.2 wt. %, ≥0.3 wt. % or even ≥0.4 wt. %, especially when the preferred starting materials mentioned above are used for carrying out the inventive process. In addition, in most instances, the starting material will not contain more than 0.5 wt. % of these impurities. However, because this starting material is, or is derived from, a naturally-occurring material in which the sand grains themselves may contain some ingrained impurities, in some runs of the inventive process, the impurity concentration may rise to level of 0.5 wt. %, 0.6 wt. %, 0.7 wt. %, 0.8 wt. %, 0.9 wt. % or even 1.0 wt. %. However, these situations are desirably avoided, at least in the preferred embodiment of this invention.

The particle size of the silica starting material of this invention is not critical and generally any particle size can be used. As well understood in the art, different end products made with fillers require or at least prefer fillers with particular particle sizes. In addition, as further discussed below, only a limited change in particle size occurs as a result of the inventive thermal treatment process, typically an increase of less than 20%. That being the case, the particle size of the starting material used to make a particular batch of ultra-white granular silica-based filler in accordance with this invention will normally be selected so that the particle size of that batch is appropriate for the end product to be made with that batch.

Most commonly, the silica starting material will be a raw quartz sand having a particle size of 30 to 170 mesh (U.S.). However, starting materials with other particle sizes can also be used. Thus, the silica starting material can have a gravel particle size of 2.5 to 8 mesh (U.S.), a grit or coarse sand particle size of 8 to 70 mesh (U.S.), or a fine sand particle size of 70 to 170 mesh (U.S.). Fine powder with a particle size of 140 to 200 mesh (U.S.) can also be used but is not preferred.

A particular advantage of this invention is that it can use, as its starting material, waste sand fractions that are often found in various different sand plants. Many industrial sand plants are operated to produce sand fractions of different particle sizes and/or particle size distributions for making different products such as glass, proppants, play sand, concrete sand, etc. As a result, high quality, high purity sand fractions having particle sizes of limited commercial interest are often produced, e.g., 100 mesh or finer. These sand fractions are either not used as all, or in some instances, must be discharged to waste such as by burying them underground or otherwise returning them to the mine, beach, or other geological location from which they were originally obtained. Accordingly, these sand fractions, hereinafter "waste sand by-products" either have no value at all or, more commonly, have a negative value due the cost of discharging them to waste.

In accordance with this invention, using these waste sand by-products as the source for the starting sand material of the inventive process not only minimizes the cost of the process as a whole but actually reduces the operating costs of the underlying sand plant since it enables significant waste disposal costs to be avoided. For example, a waste quartz sand fraction having a significant portion with a particle size of 100 mesh such as obtained, for example, as a by-product in the manufacture of +70 frac sand can be used as the starting material of the inventive process, either as is or after being further purified in the manner discussed above. For example, if this waste fraction contains impurities predominantly of greater than 70 or 50 mesh particle size, then this waste fraction can be further processed such as by sieving to remove the +70 mesh portion or even the +50 mesh portion of this fraction. This approach of physically separating darkened contaminants finds particular application when the sand raw material is derived from sandstone.

The silica starting material of the inventive process can include a suitable flux if desired, i.e., a material which will cause the crystal structure of the silica to change from quartz to cristobalite and/or tridymite under reduced thermal conditions than would otherwise be the case. Using fluxes to reduce the times and temperatures needed to transform quartz into to cristobalite/tridymite is well known and has been commercially practiced ever since industrial manufacture of cristobalite began. Typical fluxes used for this purpose include alkali and alkaline earth metal compounds such as the oxides and salts of lithium, sodium and potassium, as well as the oxides and salts of aluminum. Acids and bases which include these elements can also be used typically dissolved or dispersed in water. Concentrations are conventional and can be easily determined on a case-by-case basis by routine experimentation.

Thermal Processing

In accordance with this invention, a silica starting material as described above is heated for a time and at a temperature which are sufficient to transform the crystal structure of a substantial amount of its silica content from quartz to cristobalite.

As previously indicated, using heat to transform quartz into cristobalite has been industrially practiced for many years. In accordance with this invention, a similar heating process is carried out except that, in accordance with this invention, substantially less energy is required, because substantially lower processing temperatures and substantially shorter processing times are used. In accordance with this invention, it has been found that ultra-white silica-based fillers having whiteness levels approaching, and in some instances equaling, those exhibited by industrially-produced cristobalite can be achieved with this approach, even though substantially less thermal energy is used.

Thus, this invention recognizes that the last increment of whiteness enhancement achieved in the manufacture of industrial cristobalite, i.e., the increase in L* value from about 97 to about 98 or more, not only requires a substantial amount of thermal energy to accomplish but, in addition, is unimportant in connection with the benefits industrial cristobalite provides to many of the products in which it is used. Therefore, the inventive process and ultra-white silica-based filler were developed to provide an alternative product which performs essentially as well, or even just as well, as industrial cristobalite in many applications but at significantly lower cost.

In accordance with this invention, therefore, the silica starting material is heated to a temperature of no more than 1500° C. for no more than 45 minutes. In some embodiments, therefore, the silica starting material is heated to a temperature of no more than 1375° C. for no more than 45 minutes. In other embodiments, the silica starting material is heated to a temperature of no more than 1500° C. for no more than 20 minutes. In still other embodiments, the silica starting material is heated to a temperature of no more than 1375° C. for no more than 30 minutes. In yet additional embodiments, the silica starting material is heated to a temperature of no more than 1375° C. for periods of time no longer than 20 minutes, no longer than 15 minutes, no longer than 10 minutes, and even no longer than 5 minutes. Thereafter, the thermally processed silica is cooled to 50° C. or less, preferably to room temperature.

As a result, there is produced the ultra-white granular silica-based filler of this invention which, although having an L* value which approaches and in some instances is the same as that of industrial cristobalite, differs from industrial cristobalite in that it contain far more quartz than industrial cristobalite (≥2 wt. %, ≥3 wt. %, ≥5 wt. %, ≥10 wt. %, ≥15 wt. %, ≥20 wt. %, ≥25 wt. %, ≥30 wt. %, ≥35 wt. % and even ≥40 wt. % vs. <1 wt. % for industrial cristobalite), significantly less cristobalite than industrial cristobalite (≤80 wt. %, ≤70 wt. %, ≤60 wt. %, ≤50 wt. % and even ≤40 wt. % vs. ≥85 wt. % for industrial cristobalite) and significantly less amorphous silica than industrial cristobalite (≤2 wt. %, ≤1.5 wt. %, ≤1.0 wt. %, ≤0.5 wt. %, ≤0.3 wt. % and even ≤0.1 wt. % vs. ≥~5 w. % or more for industrial cristobalite).

Within the broad parameters discussed above, the inventive process can be operated to produce a variety of different individual products, each exhibiting its own particular combination of L* value and concentrations of cristobalite, tridymite, quartz and amorphous silica.

For example, the inventive process can be operated to produce a first subclass of ultra-white granular silica-based filler products which contain 2 to 20 wt. % quartz. These products will normally ≤80 wt. % cristobalite, more typically ≤75 wt. % or even ≤70 wt. % cristobalite, about 20 to 30 wt. % tridymite and ≤2 wt. % amorphous silica, more typically ≤1 wt. %, ≤0.5 or even wt. % ≤0.1 wt. % amorphous silica. In addition, they will normally exhibit an L* value of 97-98. Those ultra-white granular silica-based fillers in this subclass containing ≥3 wt. %, ≥4 wt. %, ≥6 wt. %, or even ≥8 wt. % quartz are more interesting.

Similarly, the inventive process can be operated to produce a second subclass of ultra-white granular silica-based filler products which contain 20 to 30 wt. % quartz. These products will normally contain ≤70 wt. % cristobalite, more typically ≤65 wt. % or even ≤60 wt. % cristobalite, about 10 to 20 wt. % tridymite and ≤2 wt. % more typically ≤1 wt. %, ≤0.5 or even wt. %≤0.1 wt. % amorphous silica. Normally, they will exhibit an L* value of 96.5-97.5 or higher.

In addition, the inventive process can be operated to produce a third subclass of ultra-white granular silica-based filler products which contain 30 to 40 wt. % quartz. These products will normally contain ≤60 wt. % cristobalite, more typically ≤55 wt. % or even ≤50 wt. % cristobalite, about 10 to 15 wt. % tridymite and ≤2 wt. % more typically ≤1 wt. %, ≤0.5 or even wt. %≤0.1 wt. % amorphous silica. Normally, they will exhibit an L* value of 95.5-96.5 or higher.

In the same way, the inventive process can be operated to produce a fourth subclass of ultra-white granular silica-based filler products which contain 40 to 50 wt. % quartz. These products will normally contain ≤55 wt. % cristobalite, more typically ≤50 wt. % or even ≤45 wt. % cristobalite, about 10 to 15 wt. % tridymite and ≤2 wt. % more typically ≤1 wt. %, ≤0.5 or even wt. % ≤0.1 wt. % amorphous silica. Normally, they will exhibit an L* value of 95.5-96 or higher.

Due to variations in starting materials and accuracy of measurement issues, it will be understood that "about" in connection with the above concentrations means that the above numbers have an accuracy of ±3 wt. %, more typically ±2 wt. %, ±1 wt. %. and even ±1 wt. % are also possible The shape of the individual particles forming the inventive ultra-white granular silica-based filler is roughly the same as the shape of the individual grains of raw sand forming the starting material of this invention. That is to say, except for the minor changes which are due to the phase transformations of the silica sand starting material from quartz to cristobalite and tridymite, the shape of the individual particles forming the inventive ultra-white granular silica-based filler remains essentially the same as that of the starting material from which they are made.

This is in marked contrast to what occurs in processes in which particulate silicas are intentionally fired/sintered in such a way that the shape of these particulates becomes far more spherical (i.e., becomes closer to a perfect sphere) such as shown, for example, in U.S. Pat. No. 10,253,219, WO 2008/098470 and WO 2018/186308. Thus, the individual particles forming the inventive ultra-white granular silica-based filler have a "circularity" (perimeter/circumference) of ≤0.85, more typically ≤0.8, ≤0.7, ≤0.6, or even ≤0.5, as determined by the photographic analytical test described in the above-noted U.S. Pat. No. 10,253,219.

The density of the inventive ultra-white granular silica-based filler is slightly less than that of the silica starting material from which it is made, decreasing by no more than 15% or so. For example, when made from a raw quartz sand fraction having a density of about 2.65 g/cc, the inventive ultra-white granular silica-based filler will have a density of about 2.35 g/cc. This means that the open porosity of the inventive the ultra-white granular silica-based filler is far less than the 30-40 vol. % open porosity of the highly porous flame-sprayed cristobalite particles shown in WO 2015/091126. Thus, the individual particles of the inventive ultra-white granular silica-based filler are believed to have an open porosity as defined in WO 2015/091126 of ≤20 vol. %, more typically ≤15 vol. %, ≤10 vol. %, ≤5 vol. % or even ≤3 vol. %.

The particle size of the inventive ultra-white granular silica-based filler as produced by the inventive thermal treatment process, i.e., before any intentional grinding, milling or comminution, is slightly coarser than that of the silica starting material from which it is made, increasing by no more than 20% or so. To this end, depending on the starting material used, the inventive the ultra-white granular silica-based filler can have a gravel particle size of 2.5 to 8 mesh (U.S.), a coarse sand or grit particle size of 8 to 70 mesh (U.S.), a fine sand particle size of 70 to 170 mesh (U.S.), and a powder particle size of 140 to 200 mesh (U.S.). Normally, the inventive ultra-white granular silica-based filler will have a minimum particle size of 170 mesh (U.S.).

Mechanical milling, grinding, comminuting, etc. can also be used to make the ultra-white granular silica-based filler of this invention in finer particle sizes. An ultra-white powder filler can be obtained by milling, grinding or comminuting the ultra-white granular silica-based filler of the present disclosure to a particle size of 325 mesh (U.S.) or finer, including to 400 mesh (U.S.) or finer. For example, 325 mesh powders have a particle size of 44 μm or finer, including 30 μm or finer, 20 μm or finer, 15 μm or finer, 10 μm or finer, 5 μm or finer, 1 μm or finer, and including 1 μm to 44 μm or finer. 400 mesh powders, for example, have a particle size of 37 μm or finer, including 30 μm or finer, 20 μm or finer, 15 μm or finer, 10 μm or finer, 5 μm or finer, 1 μm or finer, and including 1 μm to 37 μm or finer. Because particulate size contributes to the measure of the color in the CIELAB color space, the color of the ultra-white powder filler exhibits a different color range than the ultra-white granular silica-based filler from which it was obtained. This ultra-white powder filler exhibits an L* value in the CIELAB color space of 95-98.5.

Regarding purity, the inventive ultra-white granular silica-based filler normally contains less than 0.5 wt. % impurities, i.e., non-siliceous materials as indicated above. However, because the inventive ultra-white granular silica-based filler is desirably made from inexpensive starting materials, as mentioned above, it also normally contains at least some amount of these impurities, typically ≥0.05 wt. %, more typically ≥0.1 wt. %, ≥0.15 wt. %, ≥0.2 wt. %, ≥0.3 wt. % or even ≥0.4 wt. %, as further indicated above.

As previously mentioned, the inventive ultra-white granular silica filler exhibits a very high L* value, approaching, and in some instances equaling, that of industrial cristobalite, even though the thermal processing conditions used to make it are substantially less severe than those used to make industrial cristobalite. This is especially surprising given that the quartz content of the inventive ultra-white granular silica-based filler ultimately obtained is so high—typically being ≥2 wt. % but more typically ≥3 wt. %, ≥5 wt. %, ≥10 wt. %, ≥15 wt. %, ≥20 wt. %, ≥25 wt. %, ≥30 wt. %, ≥35 wt. % and even ≥40 wt. %—and the cristobalite content of the inventive ultra-white granular silica-based filler ultimately obtained is so low—typically ≤80 wt. %, ≤70 wt. %, ≤60 wt. %, ≤50 wt. % and even ≤40 wt. %.

This is especially surprising also because the inventive ultra-white granular silica-based filler contains far more impurities (typically ≥0.05 wt. %, more typically ≥0.1 wt. %, ≥0.15 wt. %, ≥0.2 wt. %, ≥0.3 wt. %, or even ≥0.4 wt. %), has a larger particle size when recovered from thermal processing (+30 mesh) and a far less spherical shape (circularity of no more than 0.70) than the ultra-high purity spherical nanoparticles shown in U.S. Pat. No. 10,253,219, WO 2008/098470 and WO 2018/186308, for example.

The inventive ultra-white granular silica-based filler and ultra-white powder filler are preferably used as is. That is to say, it is preferably used to make various man-made products as further described below without adding additional ingredients thereto such as additional amounts of industrial cristobalite, quartz, etc. However, these additional ingredients can be added, if desired. If so, the total amount of these additional ingredients that are added preferably should be ≤20 wt. %, based on the weight of the composition as a whole, i.e., based on the weight of the inventive ultra-white granular silica-based filler and/or ultra-white powder filler plus these additional ingredients. More preferably, the total amount of these additional ingredients should be ≤15 wt. %, ≤10 wt. %, ≤5 wt. % or even ≤2 wt. % on this same basis.

Man-Made Products

The inventive ultra-white granular silica-based filler and/or or ultra-white powder filler can be used to produce a wide variety of different man-made products, including both solid shaped articles as well as binders, sealants and adhesives.

Examples of solid shaped articles include engineered stone such as used to make synthetic quartz or synthetic marble kitchen countertops, artificial rocks such as used to finish fireplaces and exterior building walls, tile, brick and white architectural concrete. Such products typically contain one or more fillers and at least one or more binders which may be cement, resinous or both. Portland cement (normally including a whitener such as titanium dioxide, calcium carbonate or cristobalite) is the most common binder, although other binders including pozzolan-based binders, other hydraulic lime-based cements and the like can also be used.

In accordance with this invention, the inventive ultra-white silica-based filler can be used to replace some or all of these conventional fillers, since it has been found that this material functions just as well as these materials in terms of the physical properties of the man-made products obtained at possibly lower cost, depending primarily on the degree of whiteness desired as well as other factors such as raw material supply, location, transportation costs, etc. In addition, because the L-value of the inventive ultra-white silica-based filler approaches and sometimes equals that of industrial cristobalite, further advantages in terms of product appearance can possibly be obtained by this approach.

Although only a few embodiments of this invention have been described above, it should be appreciated that many modifications can be made without departing from the spirit and scope of the invention. All such modifications are intended to be included within this invention, which is to be limited only by the following claims.

The invention claimed is:

1. An ultra-white granular silica-based filler comprising at least 99.5 wt. % silica, wherein the crystal structure of the silica is such that the ultra-white granular silica-based filler comprises 33 to 60 wt. % cristobalite, 1 to 25 wt. % tridymite, 30 to 50 wt. % quartz and ≤2 wt. % amorphous silica, wherein the temperature of the ultra-white granular silica-based filler is 50° C. or less and further wherein the ultra-white granular silica-based filler exhibits an L* value in the CIELAB color space of 95-98.

2. The ultra-white granular silica-based filler of claim 1, wherein the silica-based filler has a minimum particle size of 170 mesh.

3. The ultra-white granular silica-based filler of claim 1, wherein the ultra-white granular silica-based filler is made by heating a silica starting material comprising at least 95% quartz silica.

4. The ultra-white granular silica-based filler of claim 2, wherein the silica starting material is a waste sand by-product produced by a sand plant.

5. The ultra-white granular silica-based filler of claim 4, wherein the ultra-white granular silica-based filler consists of the composition obtained after thermal processing without additional ingredients being added.

6. An ultra-white powder filler obtained by milling, grinding or comminuting the ultra-white granular silica-based filler of claim 1 to a particle size of 325 mesh or finer.

7. The ultra-white powder filler of claim 6 exhibiting an L* value in the CIELAB color space of 95-98.5.

8. A man-made product comprising a filler and a binder, wherein the filler comprises the ultra-white granular silica-based filler of claim 1.

9. The man-made product of claim 8, wherein the product is one of engineered stone, mortar, grout, adhesives, sealants and concrete.

10. A process for producing an ultra-white granular silica-based filler according to claim 1 comprising heating a silica starting material comprising at least 95% quartz silica for a time and at a temperature sufficient so that at least some of the silica in the silica starting material is converted from a quartz crystal structure to a cristobalite crystal structure and thereafter cooling the heated product so made to 50° C. or less, wherein the silica starting material is heated sufficiently so that 30 to 50 wt.% of the silica in the ultra-white granular silica-based filler ultimately obtained has a quartz crystal structure and further so that the ultra-white granular silica-based filler contains ≤2 wt.% amorphous silica and exhibits an L* value in the CIELAB color space of 95-98.

11. The process of claim 10, wherein the silica starting material includes a fluxing agent which contains chemically combined sodium and/or potassium.

12. The process of claim 10, wherein the silica starting material has a particle size of 30-170 mesh.

13. The process of claim 12, wherein the silica starting material is derived from a waste sand by-product produced by a sand plant.

14. The process of claim 10, wherein the silica starting material is heated to a temperature of no more than 1500° C. for no more than 45 minutes.

15. The process of claim 14, wherein the silica starting material is heated to a temperature of no more than 1375° C. for no more than 45 minutes.

16. The process of claim 14, wherein the silica starting material is heated to a temperature of no more than 1500° C. for no more than 20 minutes.

17. The process of claim 14, wherein the silica starting material is heated to a temperature of no more than 1375° C. for no more than 30 minutes.

18. The process of claim 14 further comprising milling, grinding or comminuting the resulting ultra-white granular silica-based filler to obtain an ultra-white powder filler having particle size of 325 or finer.

19. The process of claim 18, wherein the ultra-white powder filler exhibits an L* value in the CIELAB color space of 95-98.5.

\* \* \* \* \*

UNITED STATES PATENT AND TRADEMARK OFFICE
CERTIFICATE OF CORRECTION

| | |
|---|---|
| PATENT NO. | : 11,629,059 B2 |
| APPLICATION NO. | : 17/005751 |
| DATED | : April 18, 2023 |
| INVENTOR(S) | : Gregory Kenneth Bedford and Claud Eric Westbrook, III |

It is certified that error appears in the above-identified patent and that said Letters Patent is hereby corrected as shown below:

In the Claims

Column 9, Claim 1, Line 8, remove:
tridymite, 30 to 50 wt. % quartz and £2 wt.% amorphous
Insert:
--tridymite, 30 to 50 wt. % quartz and $\leq 2$ wt.% amorphous--

Column 10, Claim 10, Line 9, remove:
based filler contains £2 wt.% amorphous silica and exhibits
Insert:
--based filler contains $\leq 2$ wt.% amorphous silica and exhibits--

Signed and Sealed this
Thirtieth Day of May, 2023

Katherine Kelly Vidal
*Director of the United States Patent and Trademark Office*